(12) United States Patent
Swartzentruber

(10) Patent No.: US 8,371,755 B2
(45) Date of Patent: Feb. 12, 2013

(54) SLEEVE BEARING DEVICE

(75) Inventor: David Swartzentruber, Beloit, WI (US)

(73) Assignee: Mastergear Worldwide A Division of Recal-Beloit Corporation, Beloit, WI (US)

( * ) Notice: Subject to any disclaimer, the term of this patent is extended or adjusted under 35 U.S.C. 154(b) by 887 days.

(21) Appl. No.: 12/151,433

(22) Filed: May 6, 2008

(65) Prior Publication Data

US 2009/0041397 A1     Feb. 12, 2009

Related U.S. Application Data

(60) Provisional application No. 60/963,746, filed on Aug. 6, 2007.

(51) Int. Cl.
*F16C 33/02* (2006.01)

(52) U.S. Cl. .......................... 384/296; 384/295

(58) Field of Classification Search .............. 384/94–95, 384/129–130, 271, 276, 280, 291, 290, 294–296, 384/488; 277/292, 429; 418/73, 131–132
See application file for complete search history.

(56) References Cited

U.S. PATENT DOCUMENTS

| | | | | | |
|---|---|---|---|---|---|
| 1,402,349 | A | * | 1/1922 | Geer | 384/292 |
| 2,824,522 | A | * | 2/1958 | Compton | 418/132 |
| 3,071,169 | A | * | 1/1963 | Hausen et al. | 141/80 |
| 3,637,272 | A | * | 1/1972 | Christiansen | 384/542 |
| 3,833,319 | A | * | 9/1974 | Eglington | 418/132 |
| 3,961,870 | A | * | 6/1976 | Vlemmings | 418/73 |
| 4,090,820 | A | * | 5/1978 | Teruyama | 418/132 |
| 4,120,596 | A | * | 10/1978 | Kunkle | 403/14 |
| 4,358,260 | A | * | 11/1982 | Joyner | 418/132 |
| 4,368,013 | A | * | 1/1983 | Toogood | 418/74 |
| 4,386,663 | A | * | 6/1983 | Ippolito | 384/94 |
| 4,406,441 | A | * | 9/1983 | Lukesch et al. | 251/214 |
| 4,572,589 | A | * | 2/1986 | White | 384/271 |
| 4,750,847 | A | * | 6/1988 | Boyd | 384/130 |
| 4,878,766 | A | * | 11/1989 | Boyd | 384/130 |
| 5,295,756 | A | * | 3/1994 | Ohta | 403/11 |
| 5,743,670 | A | * | 4/1998 | Ader | 403/296 |
| 5,848,614 | A | * | 12/1998 | Becker | 137/801 |
| 6,382,247 | B1 | * | 5/2002 | Gundry | 137/556.3 |
| 6,631,929 | B1 | * | 10/2003 | Pickering | 285/321 |

FOREIGN PATENT DOCUMENTS

JP     2002202100 A  *  7/2002

* cited by examiner

*Primary Examiner* — Marcus Charles
(74) *Attorney, Agent, or Firm* — David J Archer

(57) ABSTRACT

A sleeve bearing device is disclosed for supporting a worm gear journal disposed within a casing of a valve actuator. The device includes a ring shaped portion having an inboard and an outboard end. The outboard end of the ring shaped portion defines a radially outwardly extending flange which cooperates with the casing for inhibiting axial movement of the ring shaped portion relative to the casing. The ring shaped portion is of cylindrical configuration and defines an inner and an outer surface. The inner surface of the ring shaped portion bearingly supports the worm gear journal. The outer surface of the ring shaped portion cooperates with the casing, the casing defining an annular groove. The annular groove is disposed coaxially relative to the ring shaped portion, the annular groove being located adjacent to the outer surface of the ring shaped portion and between the inboard and the outboard ends of the ring shaped portion. A sealing ring is disposed within the annular groove, the sealing ring sealing the outer surface of the ring shaped portion relative to the casing.

10 Claims, 2 Drawing Sheets

SLEEVE BEARING DEVICE

CROSS REFERENCE TO RELATED APPLICATION

The present application is a Complete application filed pursuant to provisional application U.S. Ser. No. 60/963,746 filed Aug. 6, 2007. All of the disclosure of U.S. Ser. No. 60/963,746 is incorporated herein by reference.

BACKGROUND OF THE INVENTION

1. Field of the Invention

The present invention relates to a sleeve bearing device. More specifically, the present invention relates to a sleeve bearing device for supporting a worm gear journal disposed within a casing of a valve actuator.

2. Background Information

Typically, the journal of a gear quadrant or worm gear is bearingly supported by a plain bearing which is machined from the gear casing. Such machined bearings are relatively expensive to manufacture. Also, in the event of bearing wear, replacement of a significant portion of the casing is required.

The present invention overcomes the aforementioned problems by the provision of a replaceable sleeve bearing which is located within the casing for bearingly supporting the worm gear journal.

Therefore, the primary feature of the present invention is the provision of a sleeve bearing device that overcomes the problems associated with the prior art bearing arrangements and which makes a significant contribution to the journal bearing art.

Another feature of the present invention is the provision of a sleeve bearing device that adequately supports a worm gear journal while reducing the manufacturing costs thereof.

Other features and advantages of the present invention will be readily apparent to those skilled in the art by a consideration of the detailed description of a preferred embodiment of the present invention contained herein.

SUMMARY OF THE INVENTION

The present invention relates to a sleeve bearing device for supporting a worm gear journal disposed within a casing of a valve actuator. The device includes a ring shaped portion having an inboard and an outboard end. The outboard end of the ring shaped portion defines a radially outwardly extending flange which cooperates with the casing for inhibiting axial movement of the ring shaped portion relative to the casing. The ring shaped portion is of cylindrical configuration and defines an inner and an outer surface. The inner surface of the ring shaped portion bearingly supports the worm gear journal. The outer surface of the ring shaped portion cooperates with the casing, the casing defining an annular groove. The groove is disposed coaxially relative to the ring shaped portion, the annular groove being located adjacent to the outer surface of the ring shaped portion and between the inboard and the outboard ends thereof. A sealing ring is disposed within the annular groove, the sealing ring sealing the outer surface of the ring shaped portion relative to the casing.

In a more specific embodiment of the present invention, the ring shaped portion is fabricated from metal. More specifically, the ring shaped portion is fabricated from bronze.

The outwardly extending flange is seated within a cooperating counter bore defined by the casing and the outer surface of the ring shaped portion cooperates with a bore defined by the casing.

Moreover, the inner surface of the ring shaped portion is of uniform cross sectional configuration from the inboard end to the outboard end thereof.

Also, the outer surface of the ring shaped portion is of uniform cross sectional configuration from the inboard end to the outboard end of the ring shaped portion.

Furthermore, the outer surface of the ring shaped portion has a cross sectional area which is slightly less than a cross sectional area of the bore defined by the casing. The arrangement is such that, axial movement of the ring shaped portion within the bore from the outboard end is permitted.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
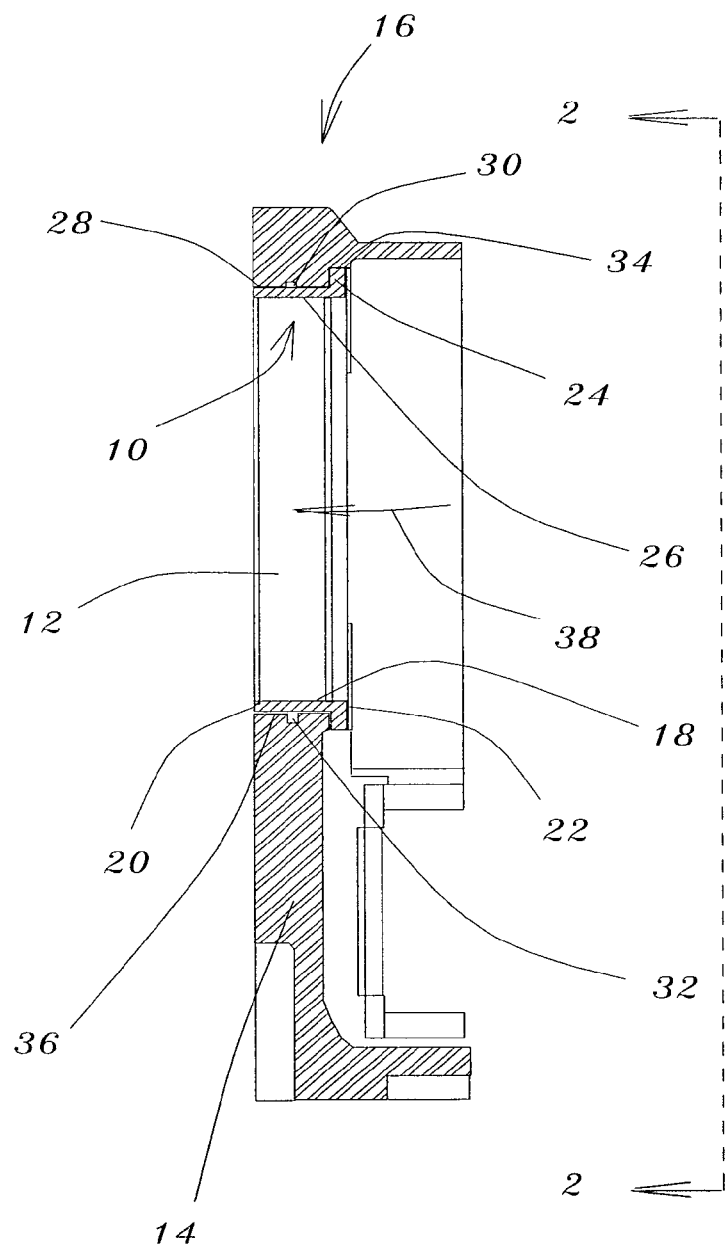
FIG. 1 is a side sectional view of a sleeve bearing device according to the present invention.

FIG. 1 is a side sectional view of a sleeve bearing device generally designated 10 according to the present invention.

As shown in FIG. 1, the sleeve bearing device 10 is for supporting a worm gear journal 12 disposed within a casing 14 of a valve actuator generally designated 16. The device 10 includes a ring shaped portion 18 having an inboard and an outboard end 20 and 22 respectively. The outboard end 22 of the ring shaped portion 18 defines a radially outwardly extending flange 24 which cooperates with the casing 14 for inhibiting axial movement of the ring shaped portion 18 relative to the casing 14. The ring shaped portion 18 is of cylindrical configuration and defines an inner and an outer surface 26 and 28 respectively. The inner surface 26 of the ring shaped portion 18 bearingly supports the worm gear journal 12. The outer surface 28 of the ring shaped portion 18 cooperates with the casing 14, the casing 14 defining an annular groove 30. The annular groove 30 is disposed coaxially relative to the ring shaped portion 18, the annular groove 30 being located adjacent to the outer surface 28 of the ring shaped portion 18 between the inboard and the outboard ends 20 and 22 respectively of the ring shaped portion 18. A sealing ring 32, such as an O-ring seal, is disposed within the annular groove 30, the sealing ring 32 sealing the outer surface 28 of the ring shaped portion 18 relative to the casing 14.

In a more specific embodiment of the present invention, the ring shaped portion 18 is fabricated from metal. More specifically, the ring shaped portion 18 is fabricated from bronze.

The outwardly extending flange 24 is seated within a cooperating counter bore 34 defined by the casing 14 and the outer surface 28 of the ring shaped portion 18 cooperates with a bore 36 defined by the casing 14.

Moreover, the inner surface 26 of the ring shaped portion 18 is of uniform cross sectional configuration from the inboard end 20 to the outboard end 22 of the ring shaped portion 18.

Also, the outer surface 28 of the ring shaped portion 18 is of uniform cross sectional configuration from the inboard end 20 to the outboard end 22 of the ring shaped portion 18.

Figure 2:
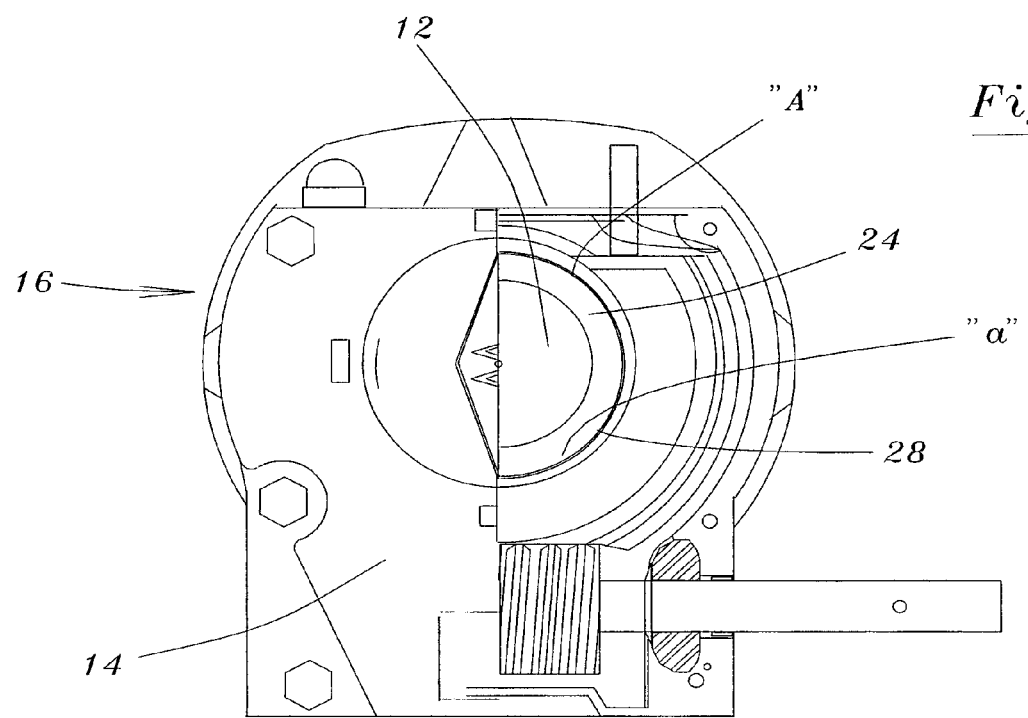
FIG. 2 is a front end view, on an increased scale, taken on the line 2-2 of FIG. 1.

FIG. 2 is a front end view, on an increased scale, taken on the line 2-2 of FIG. 1. As shown in FIG. 2, the outer surface 28 of the ring shaped portion 18 has a cross sectional area "a" which is slightly less than a cross sectional area "A" of the bore 36 defined by the casing 14.

As shown in FIG. 1, the arrangement is such that, axial movement of the ring shaped portion 18, as indicated by the arrow 38, within the bore 36 from the outboard end 22 is permitted.

In operation of the sleeve bearing device 10, the journal 12 to be supported is inserted within the ring shaped portion 18 so that the ring shaped portion 18 is prevented from axial movement 38 relative to the journal 12 by the outwardly extending flange 24 and cooperating counter bore 34. The annular sealing ring 32 prevents leakage of lubricant from within the casing 14.

The present invention provides a unique arrangement for reducing the cost of manufacturing a bearing support for a worm gear journal such arrangement permitting removal and replacement of the bearing support.

What is claimed is:

1. A sleeve bearing device for supporting a worm gear journal disposed within a casing of a valve actuator, said device comprising:
   a ring shaped portion having an inboard end and an outboard end;
   said outboard end of said ring shaped portion defining a radially outwardly extending flange which cooperates with the casing for inhibiting axial movement of said ring shaped portion relative to the casing;
   said ring shaped portion being of cylindrical configuration, said ring shaped portion defining an inner and an outer surface;
   said inner surface of said ring shaped portion bearingly supporting the worm gear journal;
   said outer surface cooperating with the casing which defines an annular groove;
   said groove being disposed coaxially relative to said ring shaped portion, said annular groove being located adjacent to said outer surface of said ring shaped portion and between said inboard and said outboard ends of said ring shaped portion; and
   a sealing ring disposed within said annular groove, said sealing ring sealing said outer surface of said ring shaped portion relative to the casing.

2. A sleeve bearing device as set forth in claim 1 wherein said ring shaped portion is fabricated from metal.

3. A sleeve bearing device as set forth in claim 1 wherein said ring shaped portion is fabricated from bronze.

4. A sleeve bearing device as set forth in claim 1 wherein said outwardly extending flange is seated within a cooperating counter bore defined by the casing.

5. A sleeve bearing device as set forth in claim 1 wherein said outer surface of said ring shaped portion cooperates with a bore defined by the casing.

6. A sleeve bearing device as set forth in claim 5 wherein said outer surface of said ring shaped portion is of uniform cross sectional configuration from said inboard end to said outboard end of said ring shaped portion.

7. A sleeve bearing device as set forth in claim 1 wherein said inner surface of said ring shaped portion is of uniform cross sectional configuration from said inboard end to said outboard end of said ring shaped portion.

8. A sleeve bearing device for supporting a worm gear journal disposed within a casing of a valve actuator, said device comprising:
   a ring shaped portion having an inboard and an outboard end;
   said outboard end of said ring shaped portion defining a radially outwardly extending flange which cooperates with the casing for inhibiting axial movement of said ring shaped portion relative to the casing;
   said ring shaped portion being of cylindrical configuration, said ring shaped portion defining an inner and an outer surface;
   said inner surface of said ring shaped portion bearingly supporting the worm gear journal;
   said outer surface cooperating with the casing which defines an annular groove;
   said groove being disposed coaxially relative to said ring shaped portion, said annular groove being located adjacent to said outer surface of said ring shaped portion and between said inboard and said outboard ends of said ring shaped portion;
   a sealing ring disposed within said annular groove, said sealing ring sealing said outer surface of said ring shaped portion relative to the casing;
   said outer surface of said ring shaped portion cooperates with a bore defined by the casing;
   said outer surface of said ring shaped portion is of uniform cross sectional configuration from said inboard end to said outboard end of said ring shaped portion; and
   said outer surface of said ring shaped portion has a cross sectional area which is slightly less than a cross sectional area of said bore defined by the casing such that axial movement of said ring shaped portion within said bore from said outboard end is permitted.

9. A sleeve bearing device for supporting a worm gear journal disposed within a casing of a valve actuator, said device comprising:
   a ring shaped portion having an inboard end and an outboard end;
   said outboard end of said ring shaped portion defining a radially outwardly extending flange which cooperates with the casing for inhibiting axial movement of said ring shaped portion relative to the casing;
   said ring shaped portion being of cylindrical configuration, said ring shaped portion defining an inner and an outer surface;
   said inner surface of said ring shaped portion bearingly supporting the worm gear journal;
   said outer surface of said ring shaped portion cooperating with the casing which defines an annular groove;
   said groove being disposed coaxially relative to said ring shaped portion, said annular groove being located adjacent to said outer surface of said ring shaped portion and between said inboard and said outboard ends of said ring shaped portion;
   a sealing ring disposed within said annular groove, said sealing ring sealing said outer surface of said ring shaped portion relative to the casing;
   said outer surface of said ring shaped portion cooperating with a bore defined by the casing;
   said outer surface of said ring shaped portion being of uniform cross sectional configuration from said inboard end to said outboard end of said ring shaped portion; and
   said outer surface having a cross sectional area which is slightly less than a cross sectional area of said bore defined by the casing such that axial movement of said ring shaped portion within said bore from said outboard end is permitted.

10. A sleeve bearing device for supporting a worm gear journal disposed within a casing of a valve actuator, said device comprising:

a ring shaped portion having an inboard end and an outboard end;

said outboard end of said ring shaped portion defining a radially outwardly extending flange which cooperates with the casing for inhibiting axial movement of said ring shaped portion relative to the casing;

said ring shaped portion being of cylindrical configuration, said ring shaped portion defining an inner and an outer surface;

said inner surface of said ring shaped portion bearingly supporting the worm gear journal;

said outer surface of said ring shaped portion cooperating with the casing which defines an annular groove;

said groove being disposed coaxially relative to said ring shaped portion, said annular groove being located adjacent to said outer surface of said ring shaped portion and between said inboard and said outboard ends of said ring shaped portion;

a sealing ring disposed within said annular groove, said sealing ring sealing said outer surface of said ring shaped portion relative to the casing;

said ring shaped portion being fabricated from bronze;

said outwardly extending flange being seated within a cooperating counter bore defined by the casing;

said outer surface of said ring shaped portion cooperating with a bore defined by the casing;

said inner surface of said ring shaped portion being of uniform cross sectional configuration from said inboard end to said outboard end of said ring shaped portion;

said outer surface of said ring shaped portion being of uniform cross sectional configuration from said inboard end to said outboard end of said ring shaped portion; and said outer surface having a cross sectional area which is slightly less than a cross sectional area of said bore defined by the casing such that axial movement of said ring shaped portion within said bore from said outboard end is permitted.

* * * * *

UNITED STATES PATENT AND TRADEMARK OFFICE
CERTIFICATE OF CORRECTION

| | | |
|---|---|---|
| PATENT NO. | : 8,371,755 B2 | Page 1 of 1 |
| APPLICATION NO. | : 12/151433 | |
| DATED | : February 12, 2013 | |
| INVENTOR(S) | : David D. Swartzentruber | |

It is certified that error appears in the above-identified patent and that said Letters Patent is hereby corrected as shown below:

On the Title Page, under item (73) Assignee: Recal-Beloit should read Regal-Beloit Signed and Sealed this
Seventh Day of May, 2013

Teresa Stanek Rea
*Acting Director of the United States Patent and Trademark Office*